United States Patent
Notoshi et al.

(10) Patent No.: US 10,591,762 B2
(45) Date of Patent: Mar. 17, 2020

(54) LIQUID CRYSTAL DISPLAY DEVICE AND METHOD FOR MANUFACTURING THE SAME

(71) Applicant: Panasonic Liquid Crystal Display Co., Ltd., Himeji-shi, Hyogo (JP)

(72) Inventors: Tomoharu Notoshi, Hyogo (JP); Kazuhiko Tsuda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/940,435

(22) Filed: Mar. 29, 2018

(65) Prior Publication Data
US 2018/0284525 A1    Oct. 4, 2018

(30) Foreign Application Priority Data
Mar. 29, 2017   (JP) .................. 2017-065243

(51) Int. Cl.
  *G02F 1/1333*   (2006.01)
  *G02F 1/1335*   (2006.01)
  *G02F 1/13*     (2006.01)
  G02F 1/1368    (2006.01)
  G02F 1/1343    (2006.01)

(52) U.S. Cl.
  CPC ...... *G02F 1/133305* (2013.01); *G02F 1/1303* (2013.01); *G02F 1/133308* (2013.01); *G02F 1/133528* (2013.01); *G02F 1/1368* (2013.01); G02F 1/134363 (2013.01); G02F 2001/133331 (2013.01); G02F 2001/133342 (2013.01); G02F 2201/56 (2013.01)

(58) Field of Classification Search
  CPC ............................................ G02F 1/133305
  See application file for complete search history.

(56) References Cited

U.S. PATENT DOCUMENTS

| 2010/0195040 A1 | 8/2010 | Koganezawa |
| 2013/0002572 A1* | 1/2013 | Jin ................. G02F 1/133305 345/173 |
| 2017/0097535 A1* | 4/2017 | Andou .............. H01L 27/326 |

(Continued)

FOREIGN PATENT DOCUMENTS

| JP | 2008-225400 | 9/2008 |
| JP | 2009-109537 | 5/2009 |
| JP | 2010-002486 | 1/2010 |

(Continued)

*Primary Examiner* — Edmond C Lau
(74) *Attorney, Agent, or Firm* — Hamre, Schumann, Mueller & Larson, P.C.

(57) ABSTRACT

A method for manufacturing a liquid crystal display device including a first substrate and a second substrate, each of the first substrate and the second substrate having flexibility, the method includes a first step of manufacturing a display panel having flexibility, the display panel including the first substrate and the second substrate, a second step of bending the display panel such that a display of the display panel is constructed with a first flat surface and a second flat surface and a curved surface disposed between the first flat surface and the second flat surface, the curved surface having a predetermined curvature radius; and a third step of fixing the display panel subjected to the second step to a cover member keeping the curved surface in a given shape.

3 Claims, 13 Drawing Sheets

(56) References Cited

U.S. PATENT DOCUMENTS

2017/0229674 A1* 8/2017 Jin ...................... H01L 51/5246
2018/0090701 A1* 3/2018 Senda ................. H01L 51/5253

FOREIGN PATENT DOCUMENTS

| JP | 2010-008479 | 1/2010 |
| JP | 2010-181545 | 8/2010 |
| JP | 2010-256660 | 11/2010 |
| JP | 2014-142399 | 8/2014 |

* cited by examiner

FIG.4
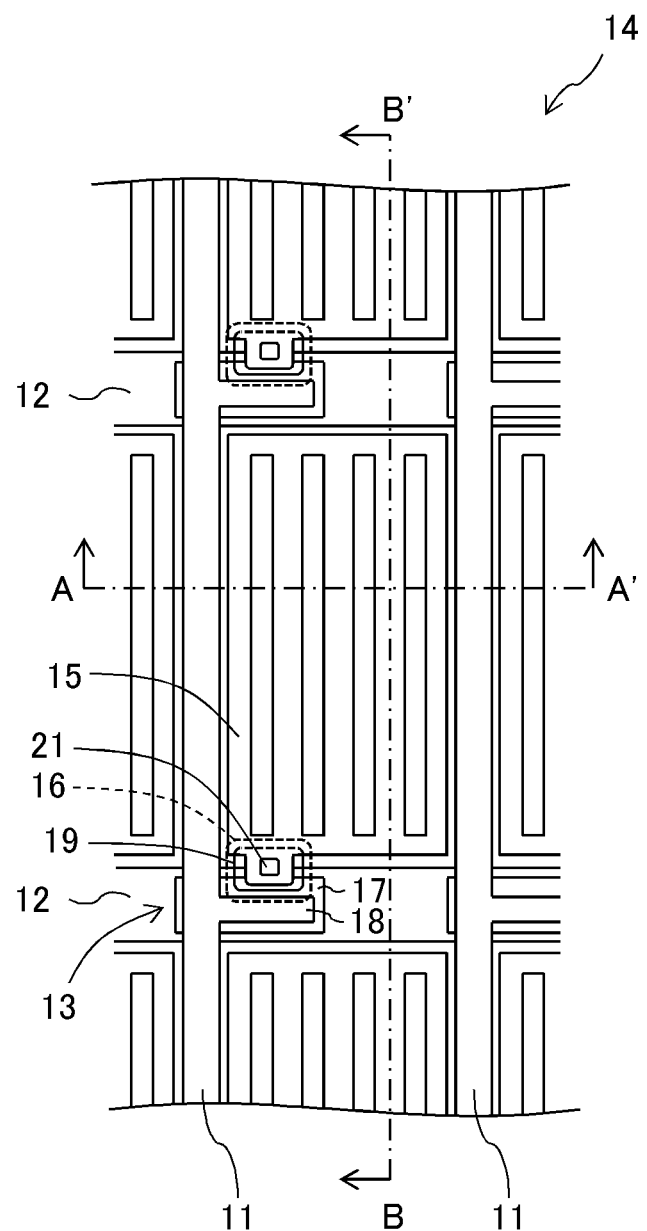
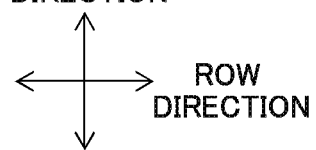

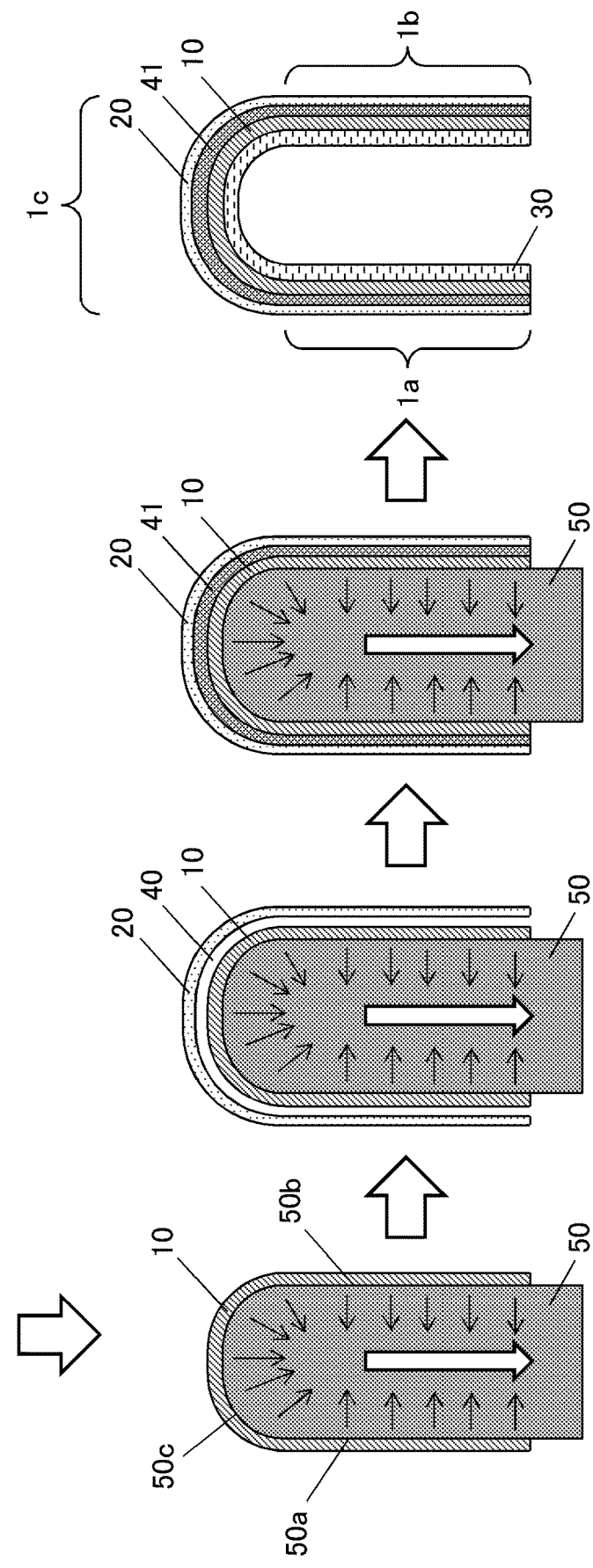

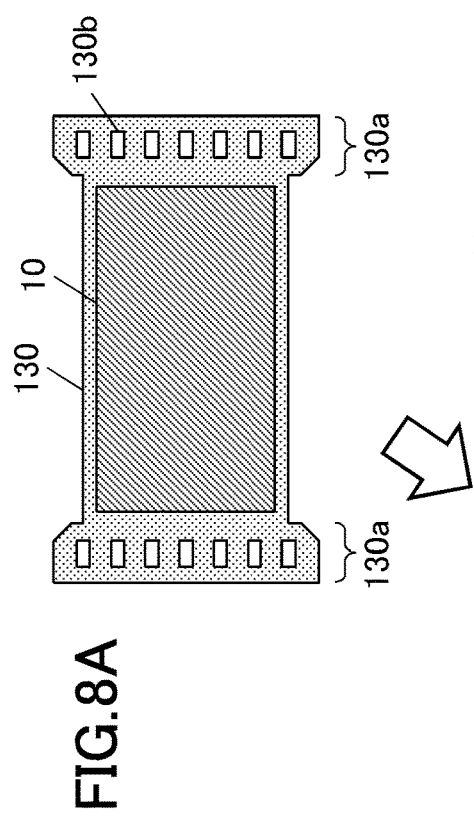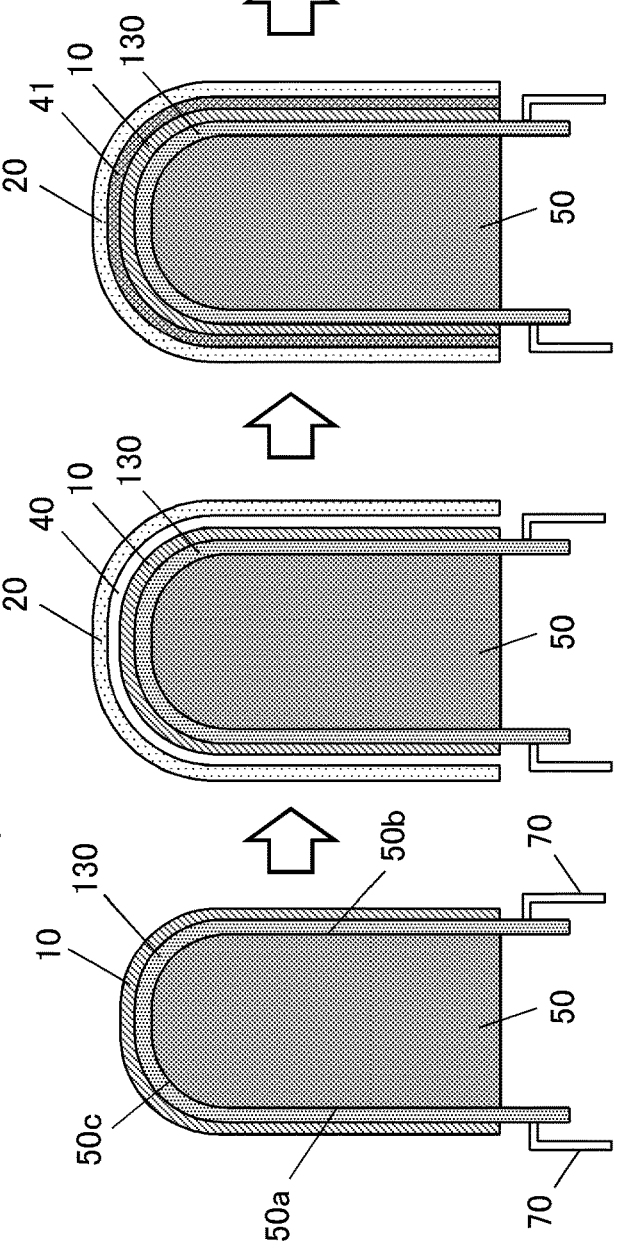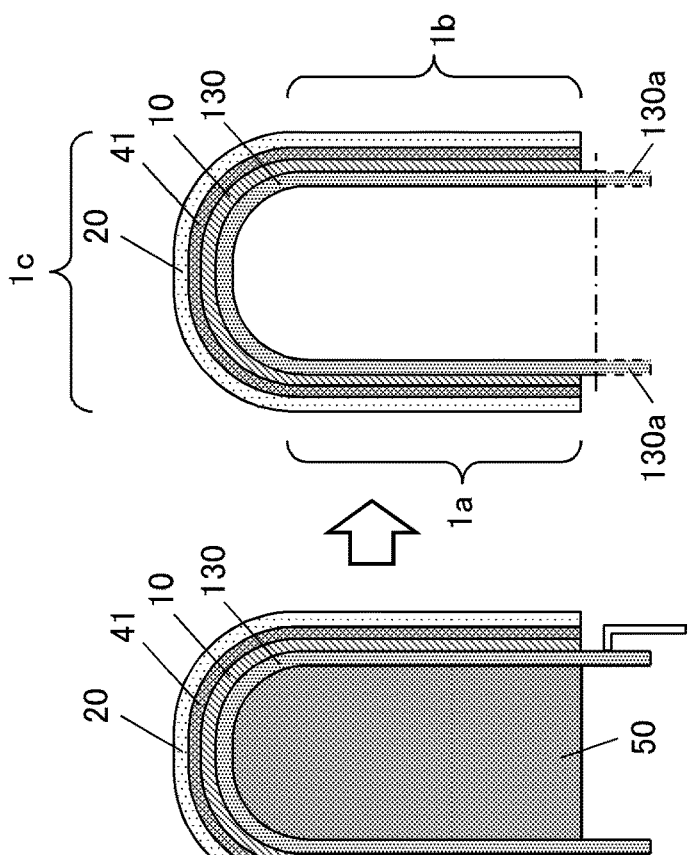

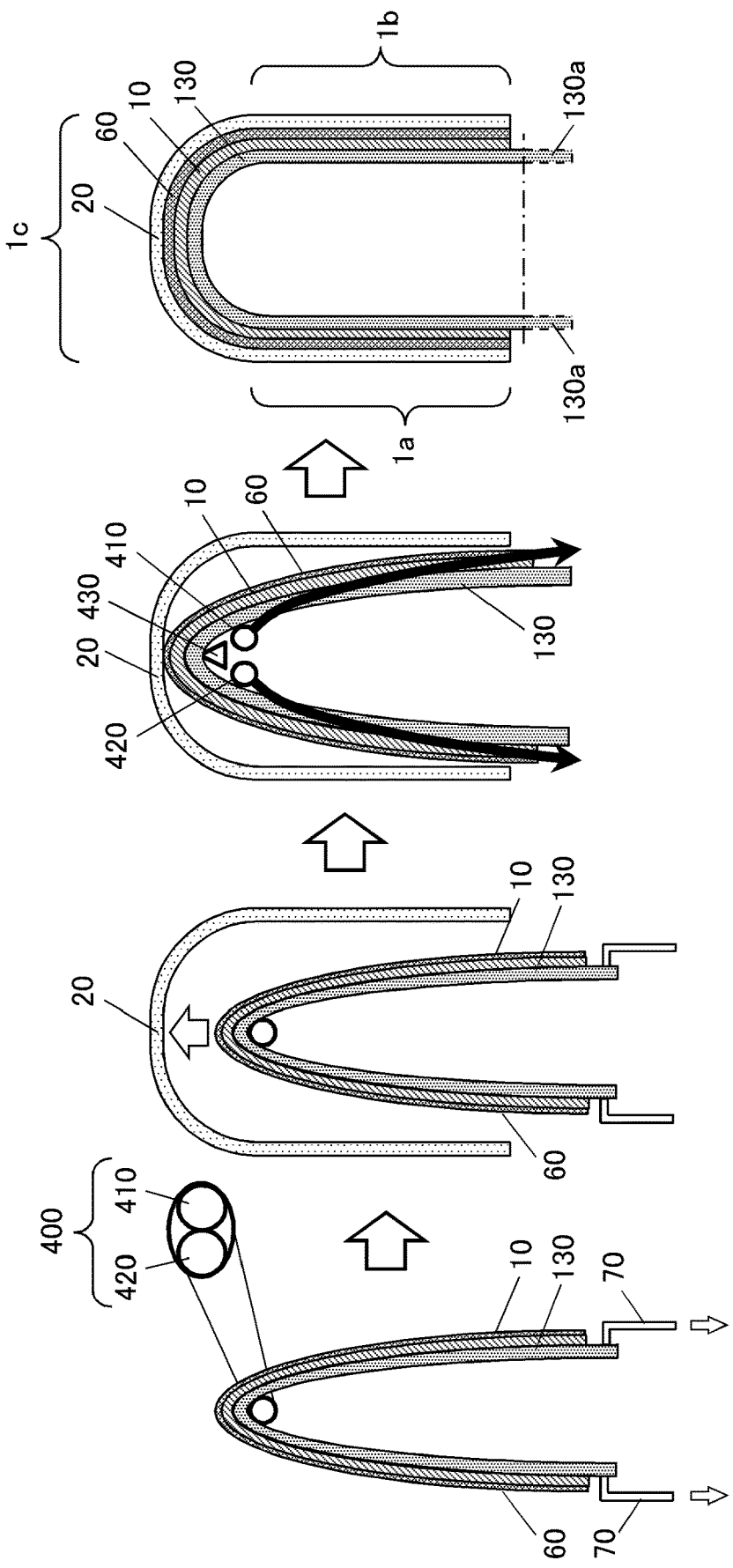

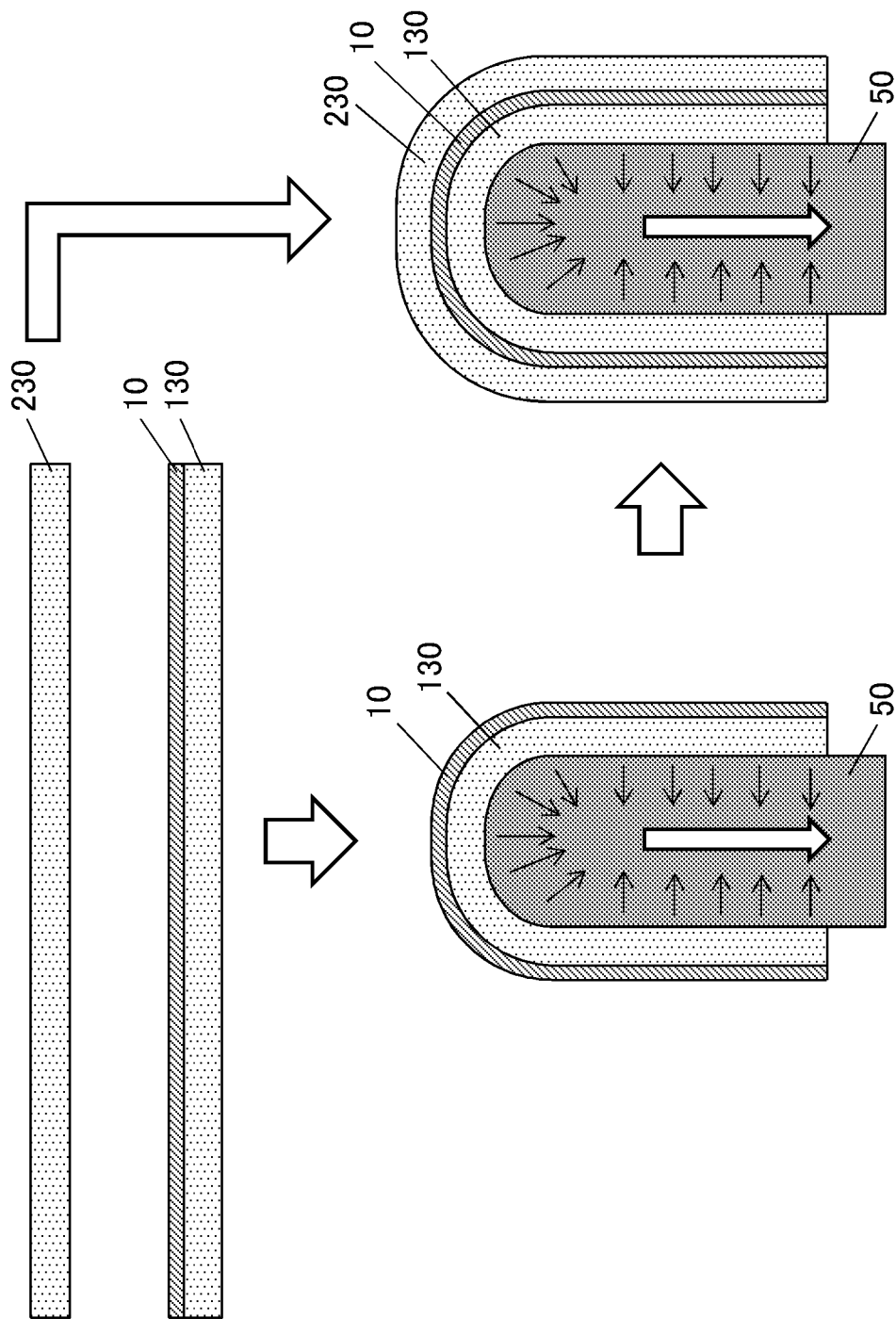

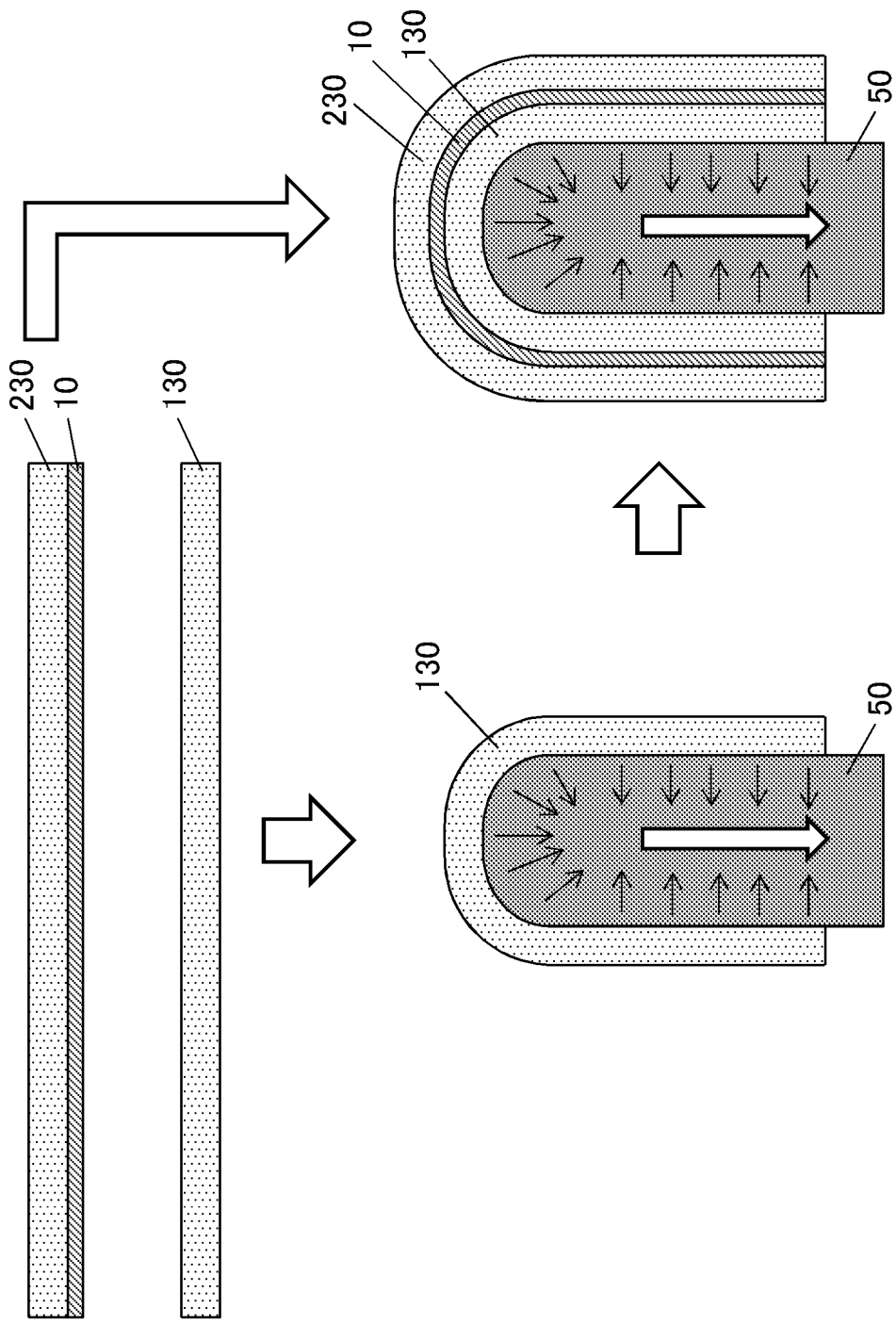

LIQUID CRYSTAL DISPLAY DEVICE AND METHOD FOR MANUFACTURING THE SAME

CROSS-REFERENCE TO RELATED APPLICATION

The present application claims priority from Japanese application JP 2017-065243 filed on Mar. 29, 2017, the content of which is hereby incorporated by reference into this application.

TECHNICAL FIELD

The present invention relates to a liquid crystal display device and a manufacturing method of the liquid crystal display device.

BACKGROUND

There is known a system (digital signage) that offers information using a display device such as a display at every place such as outdoors, public space, and transport facilities. Conventionally, the display device used in the system is, for example, constructed by bonding rear surfaces of two display devices in order to display the information on both sides (for example, see Unexamined Japanese Patent Publication No. 2014-142399).

However, in the conventional configuration, because the two display devices are required, there is a problem that cost and a weight increase. It is conceivable that the information is displayed on both sides (two directions) by bending one display device by 180 degrees at a substantial center. However, it is difficult to manufacture the display device.

The present disclosure has been made in view of the above problem and an object thereof is to provide a manufacturing method for being able to easily manufacture the both side display device.

SUMMARY

In one general aspect, the instant application describes a method for manufacturing a display device. The display device includes a first substrate and a second substrate, each of the first substrate and the second substrate having flexibility, the first substrate and the second substrate being disposed opposite to each other. The method includes a first step of manufacturing a display panel having flexibility, the display panel including the first substrate and the second substrate, a second step of bending the display panel such that a display of the display panel is constructed with a first flat surface and a second flat surface and a curved surface disposed between the first flat surface and the second flat surface, the curved surface having a predetermined curvature radius, and a third step of fixing the display panel subjected to the second step to a cover member keeping the curved surface in a given shape.

In another general aspect, a display device includes a first substrate and a second substrate, each of the first substrate and the second substrate having flexibility, the first substrate and the second substrate being disposed opposite to each other. The manufacturing method of the display device includes a first step of manufacturing a display panel having flexibility, the display panel including the first substrate and the second substrate, a second step of bonding a first polarizing plate to a first surface of the display panel while bonding a second polarizing plate including an extension unit projecting outward from the first polarizing plate in plan view to a second surface of the display panel, a third step of covering a jig in which a leading end is formed into a predetermined curvature radius with the display panel subjected to the second step, of bringing the extension unit into close contact with the display panel while pulling the extension unit, and of bending the display panel such that a display of the display panel is constructed with a first flat surface and a second flat surface and a curved surface disposed between the first flat surface and the second flat surface, the curved surface having a predetermined curvature radius, and a fourth step of fixing the display panel subjected to the third step to a cover member keeping the curved surface in a given shape.

In another general aspect, a display device includes a first substrate and a second substrate, each of the first substrate and the second substrate having flexibility, the first substrate and the second substrate being disposed opposite to each other. The manufacturing method of the display device may include a first step of manufacturing a display panel having flexibility, the display panel including the first substrate and the second substrate, a second step of bonding a first polarizing plate to a first surface of the display panel while bonding a second polarizing plate including an extension unit projecting outward from the first polarizing plate in plan view to a second surface of the display panel, a third step of covering a jig in which a leading end is formed into a predetermined curvature radius with the display panel subjected to the second step, the jig including a roller, of bringing the extension unit into close contact with the display panel while pulling the extension unit, and of bending the display panel such that a first curved surface having a predetermined curvature radius is formed in a display of the display panel, and a fourth step of covering the display panel subjected to the third step with a cover member constructed with a first flat surface and second flat surface and a second curved surface disposed between the first flat surface and the second flat surface, the second curved surface having a larger curvature radius than the first curved surface, of moving the roller from an inside of the display panel such that the roller is pressed against the cover member, and of bonding the display panel to the cover member.

In another general aspect, a display device includes a first substrate and a second substrate, each of the first substrate and the second substrate having flexibility, the first substrate and the second substrate being disposed opposite to each other. The manufacturing method of the display device includes a first step of manufacturing a display panel having flexibility, the display panel including the first substrate and the second substrate, a second step of bonding a first polarizing plate to a first surface of the display panel, a third step of bending the display panel to which the first polarizing plate is bonded such that a display of the display panel is constructed with a first flat surface and a second flat surface and a curved surface disposed between the first flat surface and the second flat surface, the curved surface having a predetermined curvature radius, a fourth step of bonding a second polarizing plate to a second surface of the display panel subjected to the third step, and a fifth step of fixing the display panel subjected to the fourth step to a cover member keeping the curved surface in a given shape.

The above general aspect may include one or more of the following features. The first flat surface and the second flat surface may be disposed parallel and opposite to each other.

The display panel may be bent such that the curvature radius of the curved surface becomes 50 mm or less.

In another general aspect, a display device includes a display panel including a display constructed with a first flat surface and a second flat surface and a curved surface disposed between the first flat surface and the second flat surface, the curved surface having a curvature radius of 50 mm or less, and a cover member that fixes the display panel while keeping the curved surface in a given shape.

The first flat surface and the second flat surface may be disposed parallel and opposite to each other.

In the liquid crystal display device manufacturing method of the present disclosure, the both side display device can easily be manufactured.

BRIEF DESCRIPTION OF THE DRAWINGS

FIG. 4 is a plan view illustrating a configuration of pixel;

FIGS. 7A-7E are views illustrating manufacturing processes of a first method for manufacturing liquid crystal display device according to an exemplary embodiment;

FIGS. 8A-8E are views illustrating a second method for manufacturing liquid crystal display device according to an exemplary embodiment;

FIGS. 9A-9D are views illustrating a third method for manufacturing liquid crystal display device according to an exemplary embodiment;

FIGS. 12A-12C are views illustrating a bending process of the liquid crystal display device according to an exemplary embodiment; and FIGS. 13A-13C are views illustrating another bending process of the liquid crystal display device according to an exemplary embodiment.

DETAILED DESCRIPTION

An embodiment of the present application is described below with reference to the drawings. The embodiment of the present application takes a liquid crystal display device as an example of a display device of the present application. However, the present application is not limited thereto, but the display device may be another kind of display, such as an organic EL display.

Figure 1:
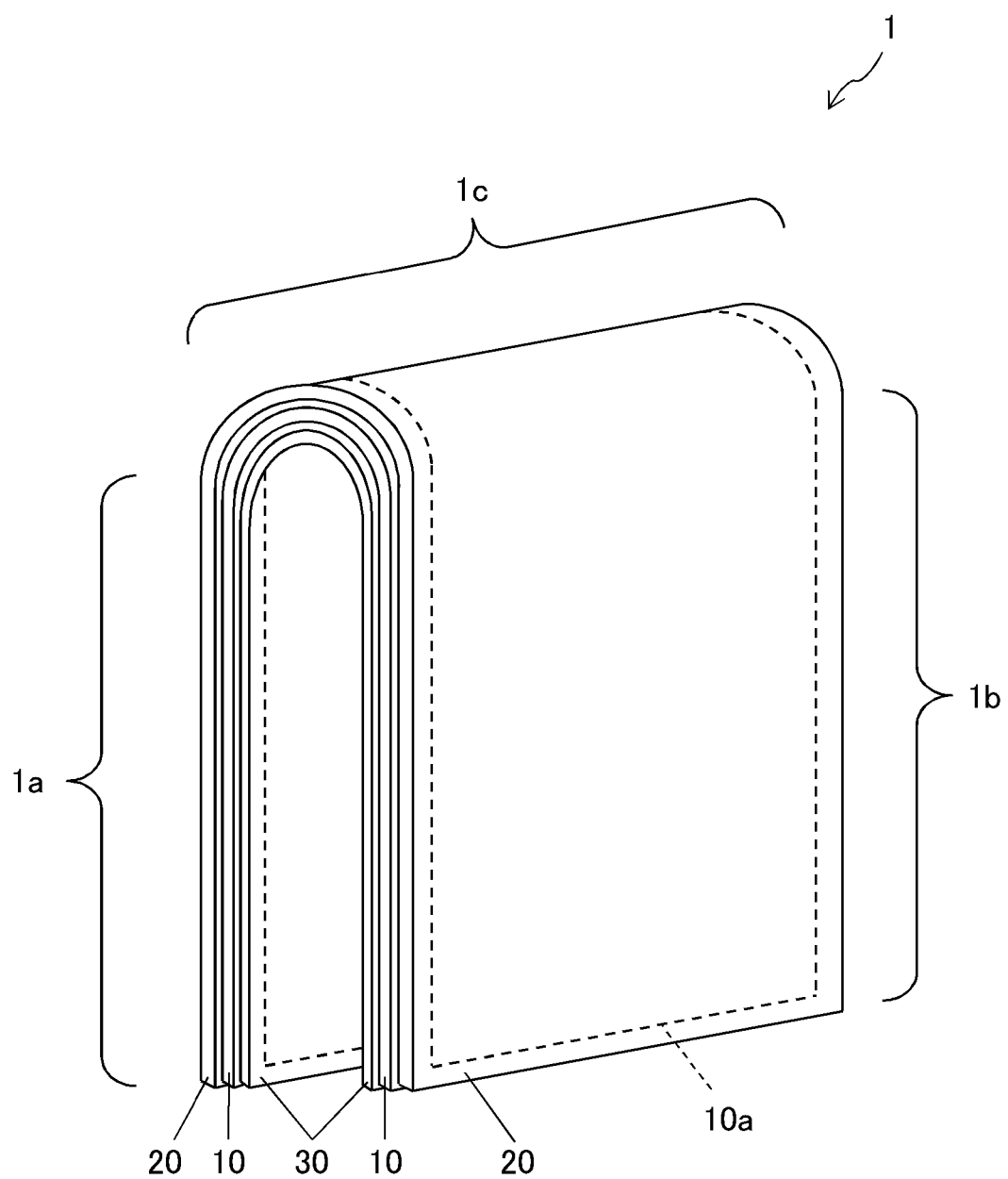
FIG. 1 is a perspective view illustrating a schematic configuration of a liquid crystal display device according to an exemplary embodiment.

FIG. 1 is a perspective view illustrating a schematic configuration of a liquid crystal display device according to an exemplary embodiment. Liquid crystal display device 1 includes display panel 10, cover glass 20 (cover member), and backlight 30. Liquid crystal display device 1 is constructed with flat surfaces 1a, 1b disposed opposite to each other, and curved surface 1c disposed between flat surfaces 1a, 1b. That is, each of at least display panel 10 and cover glass 20 is constructed with one member bent with a predetermined curvature radius in curved surface 1c. In liquid crystal display device 1, flat surface 1a, curved surface 1c, and flat surface 1b are continuously disposed to constitute one display 10a (display region).

Figure 2:
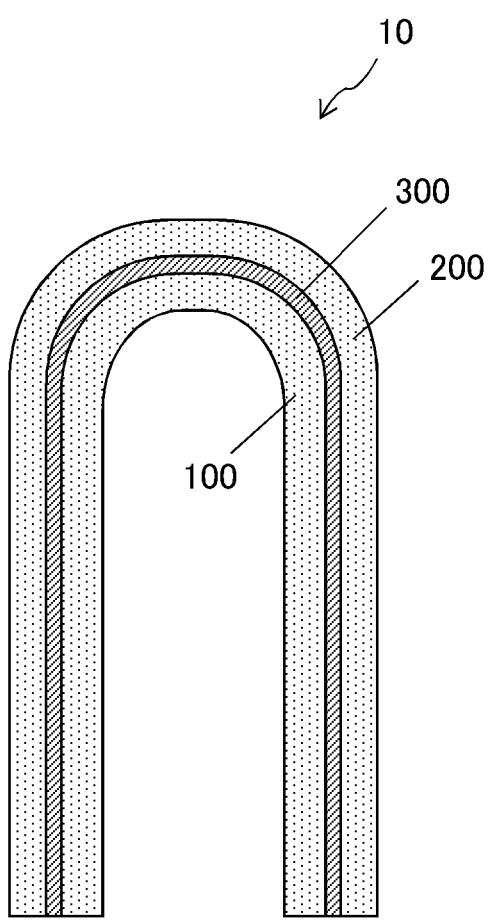
FIG. 2 is a side view of display panel according to an exemplary embodiment.

FIG. 2 is a side view of display panel 10. Display panel 10 includes thin film transistor substrate 100 (TFT substrate), color filter substrate 200 (CF substrate), and liquid crystal layer 300 sandwiched between TFT substrate 100 and CF substrate 200. Display panel 10 includes a source driver (not illustrated) and a gate driver (not illustrated). Each of thin film transistor substrate 100 and color filter substrate 200 includes a substrate (flexible substrate) made of a flexible material (for example, a polyimide-based resin material), and is bent with a predetermined curvature radius. Each of thin film transistor substrate 100 and color filter substrate 200 is constructed with a portion corresponding to flat surface 1a, 1b (see FIG. 1) and a portion corresponding to curved surface 1c (see FIG. 1).

Figure 3:
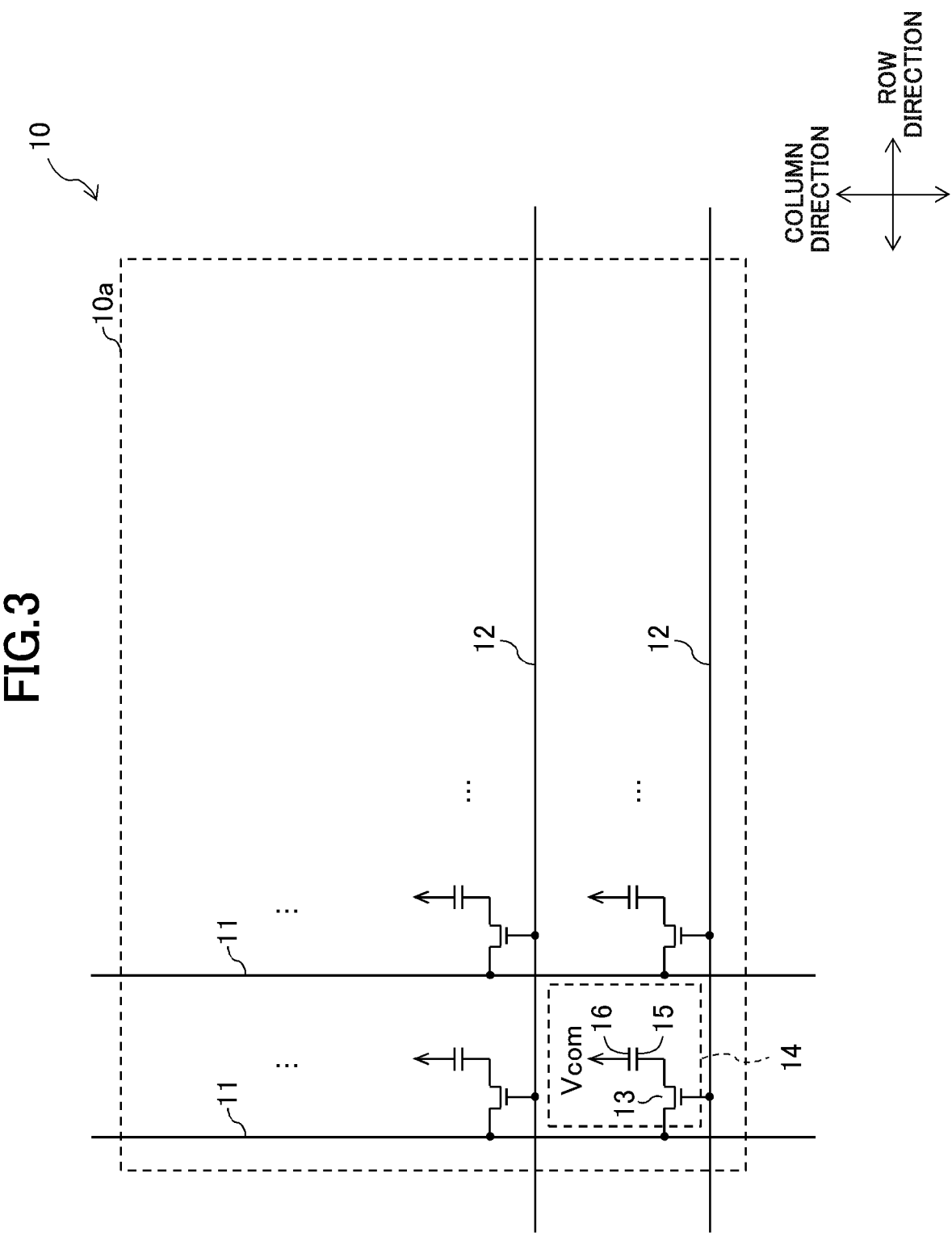
FIG. 3 is a plan view illustrating a schematic configuration of display of display panel according to an exemplary embodiment.

FIG. 3 is a plan view (equivalent circuit diagram) illustrating a schematic configuration of display 10a of display panel 10. A plurality of source lines 11 extending in a first direction (for example, a column direction) and a plurality of gate lines 12 extending in a second direction (for example, a row direction) are provided in display panel 10. Thin film transistor (TFT) 13 is provided in an intersection of each source line 11 and each gate line 12. Each source line 11 is electrically connected to the source driver, and each gate line 12 is electrically connected to the gate driver.

In display panel 10, a plurality of pixels 14 are arranged into a matrix shape (the row direction and the column direction) corresponding to the intersections of source lines 11 and gate lines 12. A plurality of pixel electrodes 15 disposed in each pixel 14 and common electrode 16 common to the plurality of pixels 14 are provided in thin film transistor substrate 100.

A data signal (data voltage) is supplied from the source driver to each source line 11, and a gate signal (a gate-on voltage and a gate-off voltage) is supplied from the gate driver to each gate line 12. Common voltage Vcom is supplied from a common driver (not illustrated) to common electrode 16. When an on-voltage (gate-on voltage) of the gate signal is supplied to gate line 12, thin film transistor 13 connected to gate line 12 is turned on, and the data voltage is supplied to pixel electrode 15 through source line 11 connected to thin film transistor 13. An electric field is generated by a difference between the data voltage supplied to pixel electrode 15 and common voltage Vcom supplied to common electrode 16. The liquid crystal is driven by the electric field, and transmittance of light emitted from backlight 30 is controlled, thereby displaying an image. For performing color display, a desired data voltage is supplied to source line 11 connected to pixel electrode 15 of pixel 14 corresponding to each of red, green, and blue, which are formed by a stripe color filter.

Figure 5:
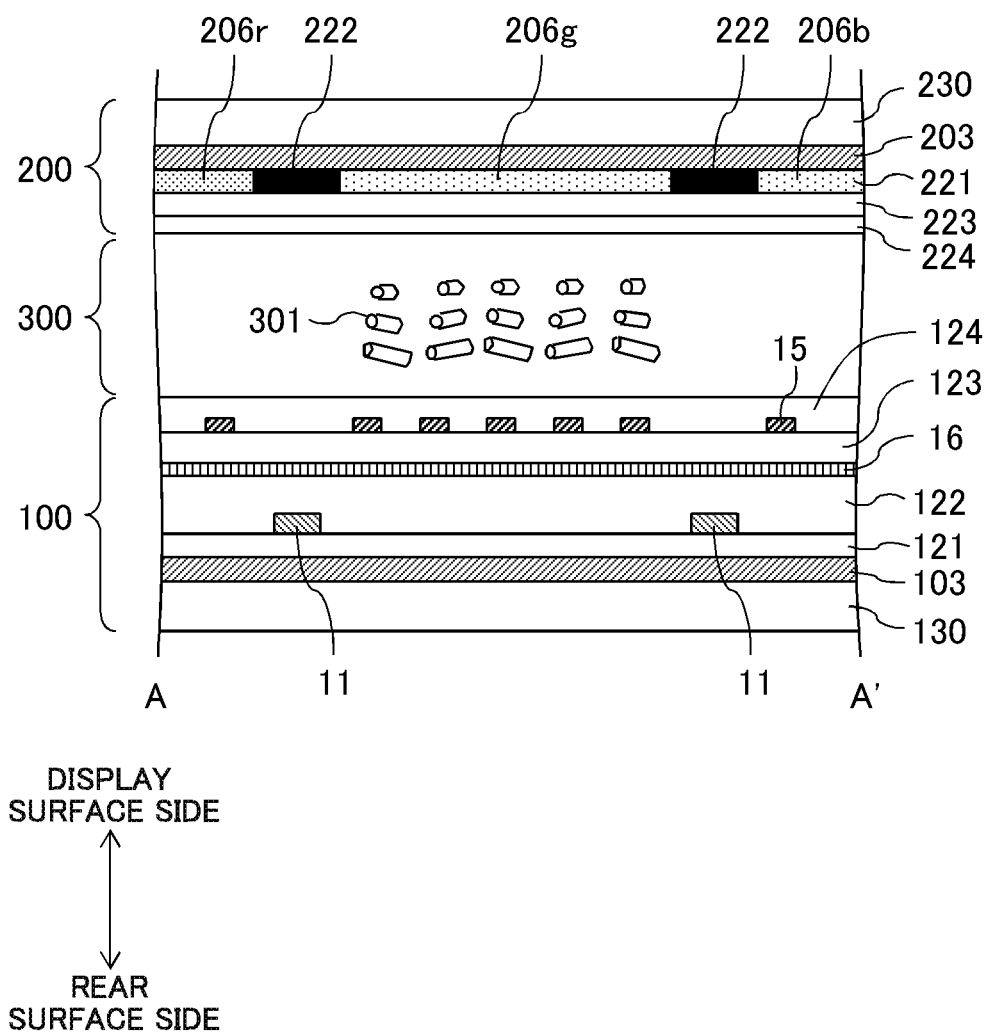
FIG. 5 is a sectional view taken along line A-A' in FIG. 4.
Figure 6:
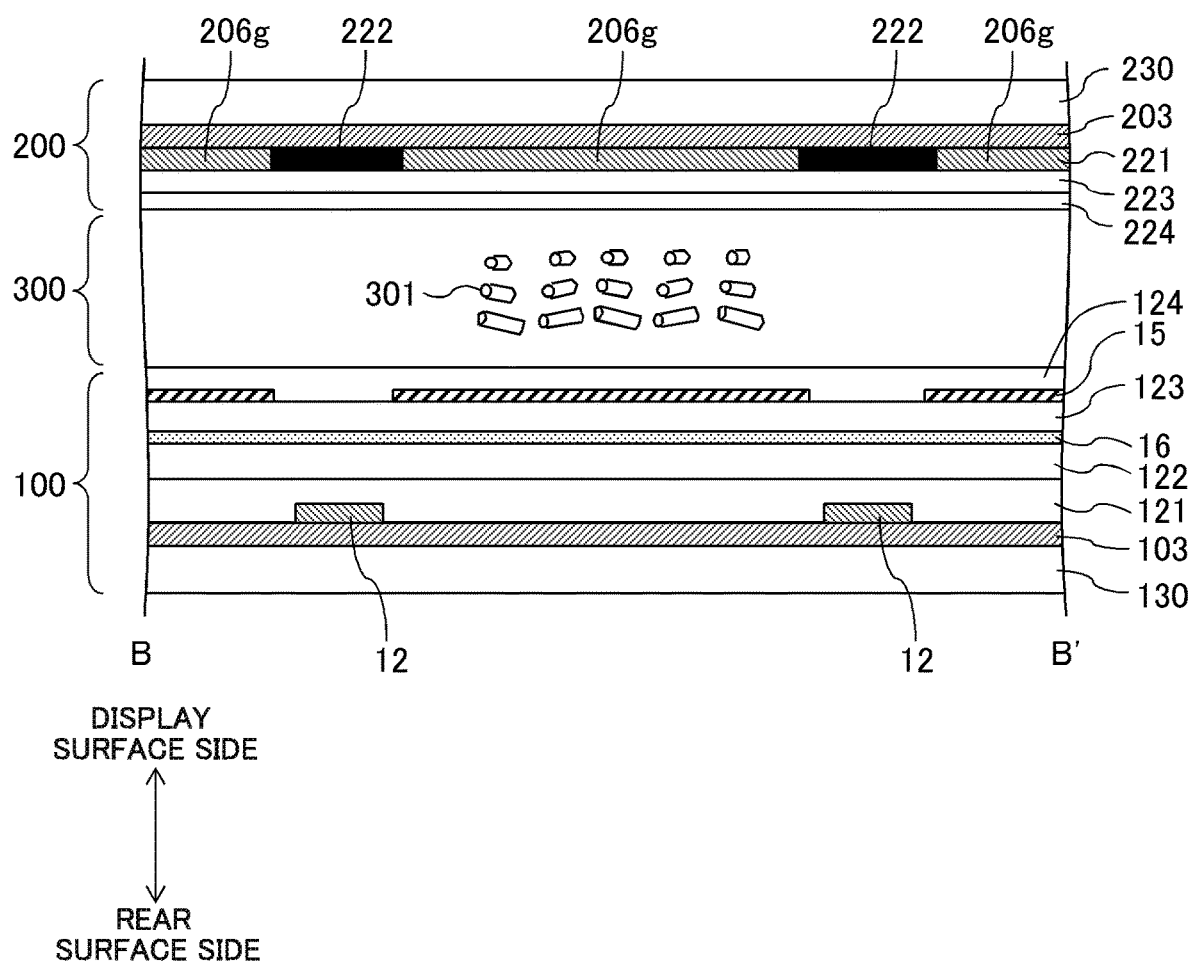
FIG. 6 is a sectional view taken along line B-B' in FIG. 4.

FIG. 4 is a plan view illustrating a configuration of pixel 14. FIG. 5 is a sectional view taken along line A-A in FIG. 4, and FIG. 6 is a sectional view taken along line B-B' in FIG. 4. A specific configuration of display panel 10 will be described with reference to FIGS. 4 to 6.

In FIG. 4, a region partitioned by two adjacent source lines 11 and two adjacent gate lines 12 corresponds to one pixel 14. Thin film transistor 13 is provided in each pixel 14. Thin film transistor 13 includes semiconductor layer 17 formed on insulator 121 (see FIG. 5), and drain electrode 18 and source electrode 19 that are formed on semiconductor layer 17 (see FIG. 4). Drain electrode 18 is electrically connected to source line 11, and source electrode 19 is electrically connected to pixel electrode 15 through through-hole 21.

Pixel electrode 15 made of a transparent conductive film such as indium tin oxide (ITO) is formed in each pixel 14. Pixel electrode 15 includes a plurality of openings (slits), and is formed into a stripe shape. One common electrode 16 made of the transparent conductive film such as ITO is formed in common to each pixel 14 over a display region. An opening is formed in a region where common electrode 16 overlaps through-hole 21 and source electrode 19 of thin film transistor 13 in order to electrically connect pixel electrode 15 and source electrode 19.

As illustrated in FIGS. 5 and 6, display panel 10 includes thin film transistor substrate 100 disposed on a rear surface side, color filter substrate 200 disposed on a display surface side, and liquid crystal layer 300 sandwiched between thin film transistor substrate 100 and color filter substrate 200.

In thin film transistor substrate 100, gate line 12 (see FIG. 6) is formed on the display surface side of flexible substrate 103, and insulator 121 is formed so as to cover gate line 12. Source line 11 (FIG. 5) is formed on insulator 121, and insulator 122 is formed so as to cover source line 11. Common electrode 16 is formed on insulator 122, and insulator 123 is formed so as to cover common electrode 16. Pixel electrode 15 is formed on insulator 123, and alignment film 124 is formed so as to cover pixel electrode 15. Polarizing plate 130 is formed on the rear surface side of flexible substrate 103.

In color filter substrate 200, black matrix 222 and color filter 206 (for example, red color filter 206*r*, green color filter 206*g*, and blue color filter 206*b*) are formed on the rear surface side of flexible substrate 203, and overcoat layer 223 is formed so as to cover black matrix 222 and color filter 206. Alignment film 224 is formed on overcoat layer 223. Polarizing plate 230 is formed on the display surface side of flexible substrate 203.

Liquid crystal 301 is enclosed in liquid crystal layer 300. Liquid crystal 301 may be negative type liquid crystal having a negative dielectric anisotropy, or positive type liquid crystal having a positive dielectric anisotropy.

Alignment films 124, 224 may be an alignment film subjected to a rubbing alignment treatment, or a photo-alignment film subjected to a photo-alignment treatment.

A laminate structure of each unit constituting pixel 14 is not limited to the configurations in FIGS. 5 and 6, but any known configuration can be adopted. As described above, liquid crystal display device 1 has the configuration of the in-plane switching (IPS) system. The configuration of liquid crystal display device 1 is not limited to the above configuration.

A first method for manufacturing liquid crystal display device 1 will be described below. The first method for manufacturing liquid crystal display device 1 includes a display panel manufacturing process, a bending process, a cover glass bonding process, and a backlight attaching process.

FIGS. 7A-7E are views illustrating manufacturing processes of the first method for manufacturing liquid crystal display device 1. First, display panel 10 is manufactured in the display panel manufacturing process (see FIG. 7A). A known method can be adopted as the display panel manufacturing process. For example, the display panel manufacturing process includes a thin film transistor substrate manufacturing process of manufacturing thin film transistor substrate 100 on a base substrate (mother glass), a color filter substrate manufacturing process of manufacturing color filter substrate 200 on a base substrate (mother glass), a substrate bonding process of bonding thin film transistor substrate 100 and color filter substrate 200, a cutting process of cutting the bonded substrates into each display panel 10 (liquid crystal cell), a peeling process of peeling the base substrates, and a polarizing plate bonding process of bonding polarizing plates 130, 230 to display panel 10.

Specifically, in each of the thin film transistor substrate manufacturing process and the color filter substrate manufacturing process, a laser light absorption film such as a-Si is deposited on a glass substrate to form a peeling layer. Then, resin mainly containing a polyimide-based resin is deposited to form the flexible substrate. Then, a TFT element layer (such as source line 11, gate line 12, thin film transistor 13, pixel electrode 15, and common electrode 16) is formed on one of the flexible substrates in the thin film transistor substrate manufacturing process, and CF element layer 205 (such as color filter 206 and black matrix 222) is formed on the other flexible substrate in the color filter substrate manufacturing process. Consequently, thin film transistor substrate 100 and color filter substrate 200 are manufactured.

In the substrate bonding process, an alignment film (see FIGS. 5 and 6) is formed on surfaces of thin film transistor substrate 100 and color filter substrate 200. Then, a sealing material is applied onto a predetermined position on thin film transistor substrate 100, and liquid crystal 301 is dropped on display 10*a* (see FIG. 1) of color filter substrate 200. Then, thin film transistor substrate 100 and color filter substrate 200 are bonded together, and the substrates are irradiated with ultraviolet light to cure the sealing material, whereby the substrates are fixed to each other.

Thin film transistor substrate 100 and color filter substrate 200, which are bonded together, are cut into each display panel (liquid crystal cell) in the cutting process. A method in which a cutter, laser light, or infrared light is used can be used as a cutting method. In the peeling process, the peeling layer is irradiated with the laser light to peel the base substrate (mother glass). Finally, polarizing plates 130, 230 are bonded to flexible substrates 103, 203 of thin film transistor substrate 100 and color filter substrate 200, respectively. Display panel 10 (liquid crystal cell) has flexibility and is completed through the above processes.

In the bending process, display panel 10 is fixed to jig 50 (see FIG. 7B). Jig 50 includes planar flat surfaces 50*a*, 50*b*, curved surface 50*c* (leading end) having a predetermined curvature radius, and a plurality of inlet ports (not illustrated) formed in flat surfaces 50*a*, 50*b* and curved surface 50*c*. Flat surfaces 50*a*, 50*b* are disposed in parallel to each other. Jig 50 is covered with display panel 10 to reduce pressure of an inside of jig 50, whereby display panel 10 is sucked by jig 50. Consequently, display panel 10 is bent along a shape of jig 50 (see FIG. 7B). The method for fixing display panel 10 is not limited to the above method.

Then, cover glass 20 (cover member) is fixed (see FIG. 7C). In cover glass 20, the curved surface is previously processed (for example, thermally processed) the predetermined curvature radius by a known method. Jig 50 to which display panel 10 is sucked and fixed is covered with already-processed cover glass 20. At this point, predetermined gap 40 (clearance) is provided between display panel 10 and cover glass 20 (see FIG. 7C). Then, gap 40 is filled with bonding agent 41 such as an Optically Clear Resin (OCR), and bonding agent 41 is irradiated with ultraviolet light and cured (see FIG. 7D). Consequently, display panel 10 and cover glass 20 are bonded and fixed to each other. Whole display panel 10 is covered with cover glass 20 while the curved surface of display panel 10 corresponding to curved surface 1c (see FIG. 1) is kept in a given shape (for example, a shape having a curvature radius of 50 mm) A cover member made of resin may be used instead of cover glass 20. Finally, jig 50 is detached, and backlight 30 is inserted (see FIG. 7E). Backlight 30 may include a light guide plate, and light emitted from a light source may be incident on an end of the light guide plate. Alternatively, in backlight 30, a plurality of LEDs may be disposed so as to cover the rear surface of display panel 10.

Liquid crystal display device 1 including flat surfaces 1a, 1b and curved surface 1c is manufactured through the above processes. Liquid crystal display device 1 in which flat surfaces 1a, 1b are disposed in parallel to each other has an outer shape of a U-shape in side view. Liquid crystal display device 1 in which the image is displayed on both sides (two directions) using one display panel 10 can easily be constructed by the above method. For this reason, cost reduction, weight reduction, and enlargement of a display area can be achieved compared with the configuration including two liquid crystal display devices.

The present disclosure is not limited to the above configuration. FIGS. 8A-8E are views illustrating a second method for manufacturing liquid crystal display device 1. Similarly to the first manufacturing method, the second method for manufacturing liquid crystal display device 1 includes the display panel manufacturing process, the bending process, the cover glass bonding process, and the backlight attaching process. Although display panel 10 manufactured through the display panel manufacturing process includes polarizing plates 130, 230, polarizing plate 130 is illustrated separately from display panel 10 in FIGS. 8A-8E for convenience. In the second manufacturing method, polarizing plate 130 having a larger area than other members (for example, polarizing plate 230) constituting display panel 10 is bonded to the rear surface side of display panel 10 through the display panel manufacturing process (see FIG. 8A). Polarizing plate 130 includes extension unit 130a projecting outward from polarizing plate 230 in plan view, and a plurality of openings 130b are formed in extension unit 130a. In the above configuration, extension unit 130a is formed integrally with polarizing plate 130. Alternatively, not limited to the above, extension unit 130a may be fixed to an end of polarizing plate 130 after formed separately from polarizing plate 130.

In the bending process, hook member 70 is attached to opening 130b of polarizing plate 130, and jig 50 is covered and brought into close contact with display panel 10 while hook member 70 is pulled (see FIG. 8B). Jig 50 includes flat surfaces 50a, 50b and curved surface 50c (leading end), but does not include the inlet port. Consequently, display panel 10 including polarizing plate 130 is bent along the shape of jig 50.

In the cover glass bonding process, cover glass 20 processed into the predetermined curvature radius is fixed while gap 40 is provided between cover glass 20 and display panel 10 (see FIG. 8C). Then gap 40 is filled with the bonding agent (OCR), and the bonding agent is irradiated with the ultraviolet light and cured. Consequently, display panel 10 and cover glass 20 are bonded and fixed to each other (see FIG. 8D). Finally, jig 50 is detached, and backlight 30 is inserted after extension unit 130a of polarizing plate 130 is cut (see FIG. 8E).

FIGS. 9A-9D are views illustrating a third method for manufacturing liquid crystal display device 1. Similarly to the first manufacturing method, the third method for manufacturing liquid crystal display device 1 includes the display panel manufacturing process, the bending process, the cover glass bonding process, and the backlight attaching process. Although display panel 10 manufactured through the display panel manufacturing process includes polarizing plates 130, 230, polarizing plate 130 is illustrated separately from display panel 10 in FIGS. 9A-9D for convenience. Although not illustrated, polarizing plate 130 includes extension unit 130a and opening 130b similarly to the configuration in FIGS. 8A-8E. Adhesive sheet 60 is bonded to the display surface side of display panel 10. For example, an OCA (Optical Clear Adhesive) film can be used as adhesive sheet 60.

In the bending process, hook member 70 is attached to opening 130b of polarizing plate 130, and display panel 10 is brought into close contact with jig 400 while hook member 70 is pulled. Jig 400 includes two rollers 410, 420, and is vertically movable. For example, the end of display panel 10 is pulled using hook member 70 while jig 400 abuts on a vicinity of a center of display panel 10, which allows the vicinity of the center of display panel 10 to be bent into a curved shape (see FIG. 9A). Then, jig 400 is moved upward to abut a center portion of display panel 10 on a center portion of cover glass 20 constructed with the flat surface and the curved surface (second curved surface) having the larger curvature radius than the curved surface (first curved surface) of display panel 10 in FIG. 9A (see FIG. 9B). Then, while center unit 430 is held, each of rollers 410, 420 is moved in a horizontal direction and downward direction so as to be pressed against cover glass 20 from the inside of display panel 10, and adhesive sheet 60 on the surface of display panel 10 is bonded to cover glass 20 (see FIG. 9C). Consequently, display panel 10 and cover glass 20 are bonded and fixed to each other. Finally, jig 400 is detached, and backlight 30 is inserted after extension unit 130a of polarizing plate 130 is cut (see FIG. 9D).

Liquid crystal display device 1 including flat surfaces 1a, 1b and curved surface 1c is manufactured by the second and third manufacturing methods. Even in the second and third manufacturing methods, similarly to the first manufacturing method, the cost reduction, the weight reduction, and the enlargement of the display area can be achieved compared with the liquid crystal display device including the two display panels.

Figure 10A:
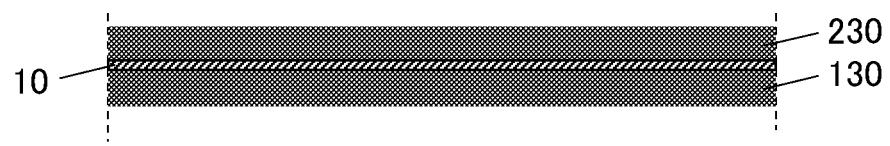
FIGS. 10A-10C is a view illustrating a state in which the liquid crystal display device is bent.
Figure 10B:
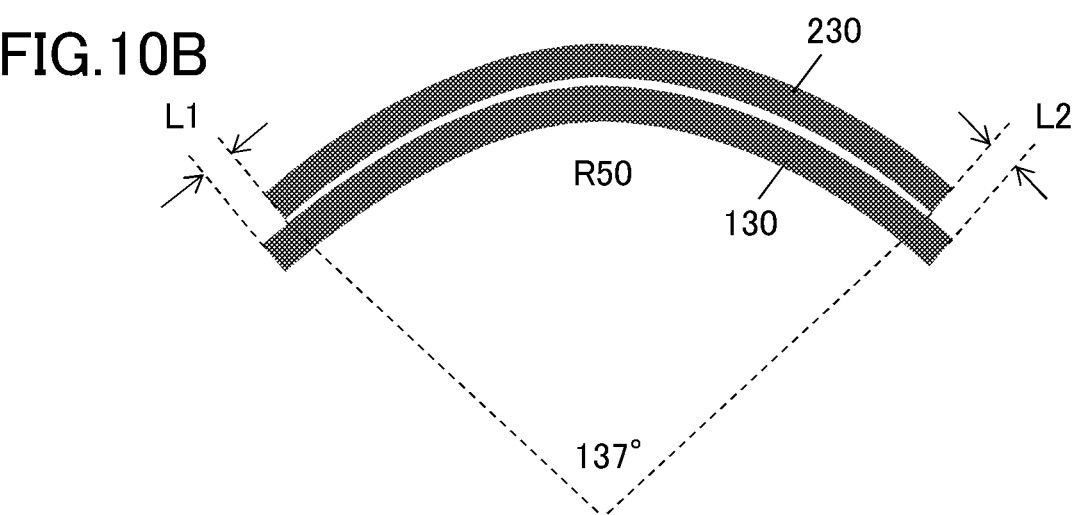
Figure 10C:
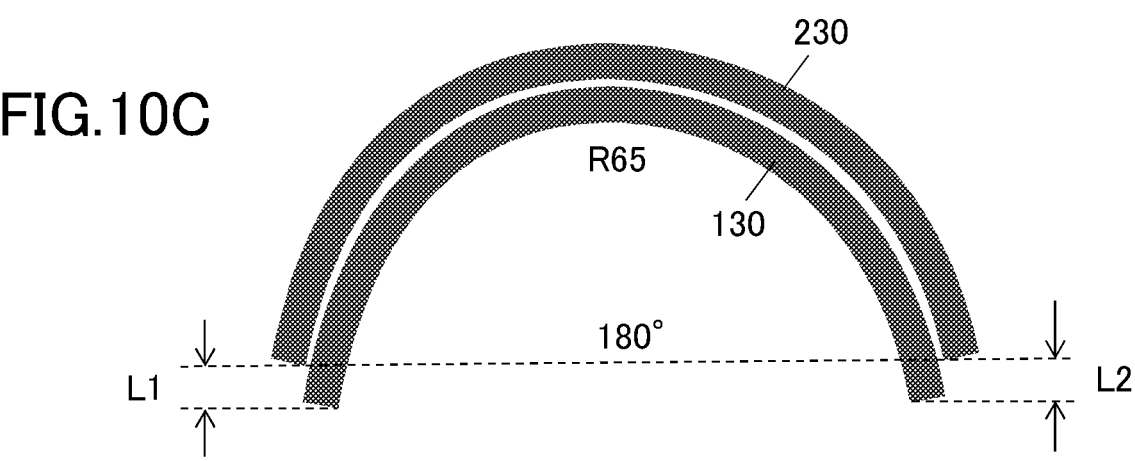

Although there is no particular limitation on the curvature radius of curved surface 1c of liquid crystal display device 1, preferably the curvature radius of curved surface 1c is equal to or less than 50 mm. FIGS. 10A-10C are views illustrating a state in which the liquid crystal display device is bent. In FIGS. 10A-10C, for convenience, polarizing plates 130, 230 are illustrated separately from display panel 10.

For example, when planar display panel 10 is bent with predetermined curvature radius R while polarizing plates 130, 230 are bonded to the display surface side and rear surface side of display panel 10, the end of display panel 10 is deformed by a difference in creepage distance between polarizing plates 130, 230, and a defect of a cell gap is generated. Specifically, for each of polarizing plates 130, 230 having a thickness of 300 um and a length of 120 mm, when display panel 10 is bend while predetermined curvature radius R is set to 50 mm based on the centers of polarizing plates 130, 230, an interior angle becomes about 137.6 degrees, and the difference (L1+L2) in creepage distance between polarizing plates 130, 230 becomes about 0.73 mm (see FIG. 10B). In the case that liquid crystal display device 1 is formed into the U-shape while curvature radius R is set to 50 mm, the interior angle becomes 180 degrees, and becomes about 1.3 times the interior angle of 137 degrees. Because the difference (L1+L2) in creepage distance between polarizing plates 130, 230 becomes about 1.3 times (=0.95 mm), the deformation increases at the end of a liquid crystal cell, a defect of the cell gap is generated to lead to degradation of display quality. As a result of an inspection of a relationship between the difference (L1+L2) in creepage distance between polarizing plates 130, 230 and the display quality, it is found that the difference (L1+L2) in creepage distance has no influence on the display quality in the case that the difference (L1+L2) in creepage distance is equal to or less than about 0.73 mm. In the case that liquid crystal display device 1 is formed into the U-shape, it is found that curvature radius R is set to 65 mm or more in order that the difference (L1+L2) in creepage distance falls within about 0.73 mm (see FIG. 10C).

Figure 11:
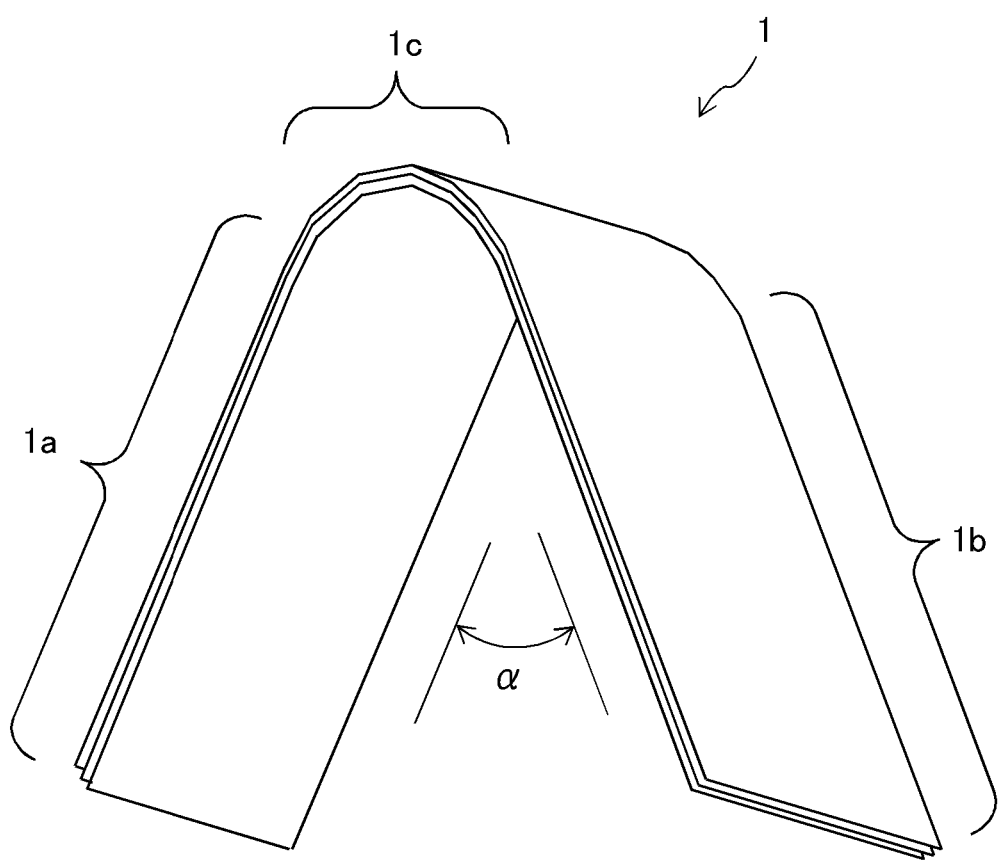
FIG. 11 is a view illustrating an angle formed between two flat surfaces disposed opposite to each other of the liquid crystal display device.

The difference in creepage distance between polarizing plates 130, 230 increases with decreasing angle α (FIG. 11) formed between flat surfaces 1a, 1b, and the difference in creepage distance between polarizing plates 130, 230 increases with decreasing curvature radius R. Thus, in order to decrease the difference in creepage distance between polarizing plates 130, 230, it is necessary to increase angle α formed between flat surfaces 1a, 1b or curvature radius R. As illustrated in FIG. 10, in the case that display panel 10 is bent into the U-shape (interior angle of 180 degrees) while polarizing plates 130, 230 are bonded to the display surface side and rear surface side of display panel 10, it is necessary that the curvature radius be set to 65 mm or more.

On the other hand, in the method (bending process) of FIGS. 12A-12C, display panel 10 is bent using jig 50 by the first manufacturing method (see FIG. 12B) while polarizing plate 130 is bonded only to the rear surface side of display panel 10 (see FIG. 12A). Then, polarizing plate 230 is bonded to display panel 10 previously subjected to the bending process using the roller (see FIG. 12C). In the method of FIGS. 12A-12C, pressure applied to the end of display panel 10 is decreased even if the difference in creepage distance between polarizing plates 130, 230 is generated, so that the defect of the cell gap can be prevented. For this reason, curvature radius R can be set to 65 mm or less, in particular 50 mm or less. As illustrated in FIGS. 13A-13C, the bending is performed while only polarizing plate 130 is in close contact with jig 50 (see FIG. 13B), and display panel 10 (see FIG. 13A) bonded to the display surface side of polarizing plate 230 may be bonded to polarizing plate 130 previously subjected to the bending process using the roller (see FIG. 13C). In the method of FIG. 13, the difference in creepage distance between polarizing plates 130 and display panel 10 is decreased compared with the method in FIGS. 12A-12C, so that the defect of the cell gap can further be prevented. The bending processes in FIGS. 12 and 13 can be applied to the bending processes of the first to third manufacturing methods.

While there have been described what are at present considered to be certain embodiments of the application, it will be understood that various modifications may be made thereto, and it is intended that the appended claims cover all such modifications as fall within the true spirit and scope of the invention.

What is claimed is:

1. A method for manufacturing a liquid crystal display device including a first substrate and a second substrate, each of the first substrate and the second substrate having flexibility, the first substrate and the second substrate being disposed opposite to each other, the method comprising:
   a first step of manufacturing a display panel having flexibility, the display panel including the first substrate and the second substrate;
   a second step of bonding a first polarizing plate to a first surface of the display panel while bonding a second polarizing plate including an extension unit projecting outward from the first polarizing plate in plan view to a second surface of the display panel;
   a third step of covering a jig in which a leading end is formed into a predetermined curvature radius with the display panel subjected to the second step, of bringing the extension unit into close contact with the display panel while pulling the extension unit, and of bending the display panel such that a display of the display panel is constructed with a first flat surface and a second flat surface and a curved surface disposed between the first flat surface and the second flat surface, the curved surface having a predetermined curvature radius; and
   a fourth step of fixing the display panel subjected to the third step to a cover member keeping the curved surface in a given shape.

2. The method for manufacturing the liquid crystal display device according to claim 1, wherein the first flat surface and the second flat surface are disposed parallel and opposite to each other.

3. The method for manufacturing the liquid crystal display device according to claim 1, wherein the display panel is bent such that the curvature radius of the curved surface becomes 50 mm or less.

* * * * *